July 17, 1928.
R. T. WILLIAMS
EXIT LIGHTING SYSTEM
Filed Jan. 14, 1927
1,677,696
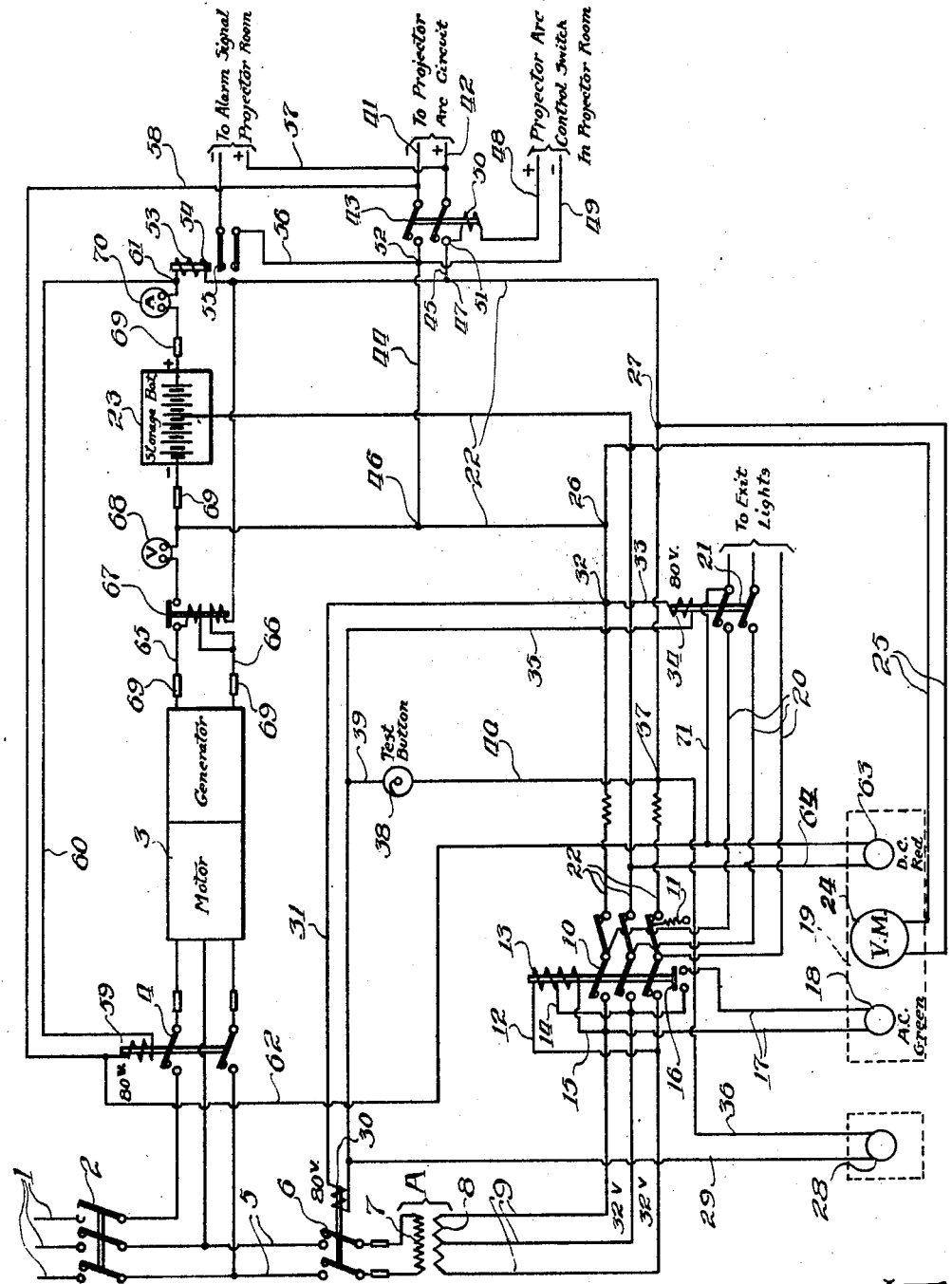
Inventor
Ralph T. Williams.
BY Rummler & Rummler
Attys.

Patented July 17, 1928.

1,677,696

UNITED STATES PATENT OFFICE.

RALPH T. WILLIAMS, OF CHICAGO, ILLINOIS, ASSIGNOR TO ROTH BROTHERS & CO., OF CHICAGO, ILLINOIS, A CORPORATION OF ILLINOIS.

EXIT-LIGHTING SYSTEM.

Application filed January 14, 1927. Serial No. 161,227.

This invention relates to an electric lighting system adapted to supply current for exit lighting and for the projecting machine in a moving picture theatre.

The main objects of this invention are to provide an improved electric light and power system which is substantially all of automatic control with the exception of the main switch; to provide a system which has a main or preferred source of power and an auxiliary source of power adapted to furnish current for exit lights upon failure of the main circuit to supply current; and to provide a system in which the current for the arc of the moving picture projecting machine is supplied from a storage battery, the charging of which is controlled by means operated by current in the projector arc circuit.

An illustrative embodiment of this invention is shown in the accompanying drawings in which the figure is a diagrammatic representation of the various circuits and controls therefor.

In the diagram shown in the drawing the main circuit or preferred source of power is represented by the conductors 1 of a three wire system passing through a manually controlled outside switch 2. The conductors 1 lead to a motor-generator set 3 through a normally open switch 4. A pair of conductors 5 bridged on two wires of the main circuit lead to a normally open switch 6, thence to the primary winding 7 of a transformer A.

The secondary winding 8 of transformer A is of the three wire type as shown by the conductors 9, each pair of which is adapted to give 32 volts. The conductors 9 lead to a normally open switch 10 which is of a six point rocking type normally held open with respect to this circuit by a spring 11.

Means for closing the switch 10 on the conductors 9 comprise a control circuit having a conductor 12 connected to one side of the circuit 9, relay winding 13 and the pair of conductors 14 and 15 leading back to circuit 9. When current is passed through the relay winding 13 it is energized to actuate the relay and close the switch 10 which carries a signal circuit switch 16 for closing a signal circuit 17. The circuit 17 includes a visual signal 18, preferably a green lamp located on the instrument board 19.

Switch 10 is connected to conductors 20 which lead to a normally open switch 21 and thence to the exit lights. The circuit formed by the conductors 20 is hereafter referred to as a lamp circuit.

When current is passing through the circuit 9 to energize the relay winding 13, the switch 10 is rocked by spring 11 to close an auxiliary circuit comprising conductors 22 which lead to a storage battery 23, preferably of a capacity to have a working voltage of 80 volts when fully charged. One of the conductors 22 is cut into the middle of this battery so that a voltage of from 32 to 40 volts can be taken off of either side of the battery.

A volt meter 24, preferably located on the instrument board 19, is connected by conductors 25 to the circuit 22 at the points 26 and 27 so as to indicate at all times the voltage of the storage battery 23.

Means for closing the normally open switches 6 and 21 comprise a manually controlled switch 28 having a conductor 29 which leads through a relay winding 30, preferably of 80 volt type, thence by conductor 31 to the circuit 22, being connected thereto at the point 32. A conductor 33 is also connected to the circuit 22 at the point 32 and leads through a similar relay winding 34, conductor 35, thence back to conductor 29, and manually controlled switch 28, both circuits being completed through a conductor 36 attached to the other side of circuit 22 in the point 37. A test button 38 is also bridged on these control circuits by conductors 39 and 40 for testing out the operation of the switches 6 and 21.

The ordinary moving picture projecting machine requires 72 to 80 volts for the arc used therein and current for this power circuit is supplied through conductors 41 and 42, through a normally open switch 43, and conductors 44 and 45 which are connected to conductors 22 at points 46 and 47 respectively so as to secure the full voltage from the storage battery 23. Switch 43 is closed by the operation of a manually controlled switch in the projector room (not shown)

which completes the circuit through conductors 48 and 49, through relay winding 50 which operates switch 43, the conductor 48 being connected to one side of the projector arc circuit at 51 and the conductor 49 being connected to the other side of the projector arc circuit at 52.

A safety alarm signal is provided in the projector room for indicating when the charge in the storage battery falls to a predetermined point and is operated by the de-energizing of a relay winding 53 which permits an armature 54 to close the contacts of a switch 55 and thus complete the alarm signal through conductors 56 and 57.

When current passes through the projector arc circuit, a certain amount passes through a shunt conductor 58 which leads to a relay winding 59 which when energized closes the main line switch 4 and thence through conductor 60 back to the positive side of the battery 61. The energizing of this circuit also closes a circuit through a conductor 62 which leads through a signal 63, preferably a red lamp located on the instrument board 19, and thence through a conductor 64 back to circuit 22.

The main switch 4 is closed by the energizing of the relay winding 59, and the motor-generator set is started in operation for the purpose of re-charging the storage battery 23, the conductors thereto being indicated at 65 and 66, passing through the usual relay cut-out 67, volt meter 68 and the customary fuses 69. An ammeter 70 is inserted in one side of the battery circuit 22 for showing the rate of discharge of the battery.

The motor-generator set is also started in operation when the transformer A fails, and the auxiliary circuit supplies current to the lamp circuit. This is accomplished by providing a conductor 71, which connects one side of the lamp circuit 20 with the conductor 62, the current passing through the relay winding 59, conductor 60, and thence back to the other side of the battery.

In the operation of this system the closing of the manual control switch 28 energizes relay windings 30 and 34 which close the switches 6 and 21 respectively. The closing of the switch 6 causes the current to be passed through the relay winding 13 which operates to close the switch 10 on the main current side, therefore permitting current to pass from the circuit 9 to the lamp circuit 20.

In case the main source of current fails, the relay winding 13 will be de-energized and the spring 11 will rock the switch 10 so as to open it from the main circuit side and close it on the auxiliary circuit 22 which leads to the storage battery 23 thereby permitting current to flow from the storage battery to the lamp circuit 20. At the time the switch 10 opens on the main circuit side, switch 16 will also be opened, thereby extinguishing the green signal lamp 18 and when current flows to the lamp circuit from the storage battery, the circuit through the red signal lamp 63 will be closed through conductors 64 and 71 thereby lighting the red lamp and indicate to its operator that the storage battery is supplying current to the lamp circuit.

When it is desired to operate the projecting machine, the projector arc control switch located in the projecting room is closed, thereby energizing the relay winding 50 which closes switch 43 permitting current to flow from storage battery to the projector arc circuit formed by the conductors 41 and 42. When the current flows through the conductor 41 the circuit is completed through conductors 58, relay winding 59 and conductor 60, thus energizing the relay winding 59 so as to close the main line switch 4 to the motor-generator set 3. This causes the motor-generator set to operate at all times that the projector arc circuit is drawing current from the storage battery 23 and in this manner the storage battery is floated on the current generated by the motor-generator set.

As the projector arc circuit normally requires approximately 72 volts of current to operate it, whereas the exit lights are of the 32 volt type, it is necessary to split the auxiliary circuit 22 so that one of its conductors cuts into the middle of the storage battery 23.

Although but one specific set of circuits has been herein shown and described, it will be understood that numerous details of the connecting up of these circuits may be altered or omitted without departing from the spirit of this invention as defined by the following claims.

I claim:

1. In an electric light and power system, a lamp circuit, a normally open switch in said circuit, a main circuit, a normally open switch in said main circuit, means controlled by current from said main circuit for connecting said main circuit with said lamp circuit, an auxiliary circuit, automatic means for connecting said auxiliary circuit with said lamp circuit upon failure of said main circuit to supply current, means controlled by current from said auxiliary circuit for closing said main circuit switch and said lamp circuit switch, a storage battery for supplying current to said auxiliary circuit, a motor-generator set for charging said battery, an arc circuit connected to said battery, and means operated by current passing through said arc circuit for connecting said motor-generator set to said main circuit.

2. In an electric light and power system, a motor-generator set, a main circuit for supplying current to said motor, a normally open switch in said main circuit, a storage battery connected so as to be charged by said generator, an arc circuit connected to said battery, means operated by current passing through said arc circuit for closing said main circuit switch, a normally open alarm circuit bridged on said arc circuit, and means for closing said alarm circuit when the charge in said storage battery lowers to a predetermined point.

Signed at Chicago this 28th day of December, 1926.

RALPH T. WILLIAMS.